July 24, 1951
T. M. HUNTER
2,561,739
ROTARY WELDING TRANSFORMER STRUCTURE
Filed March 19, 1947
6 Sheets-Sheet 1
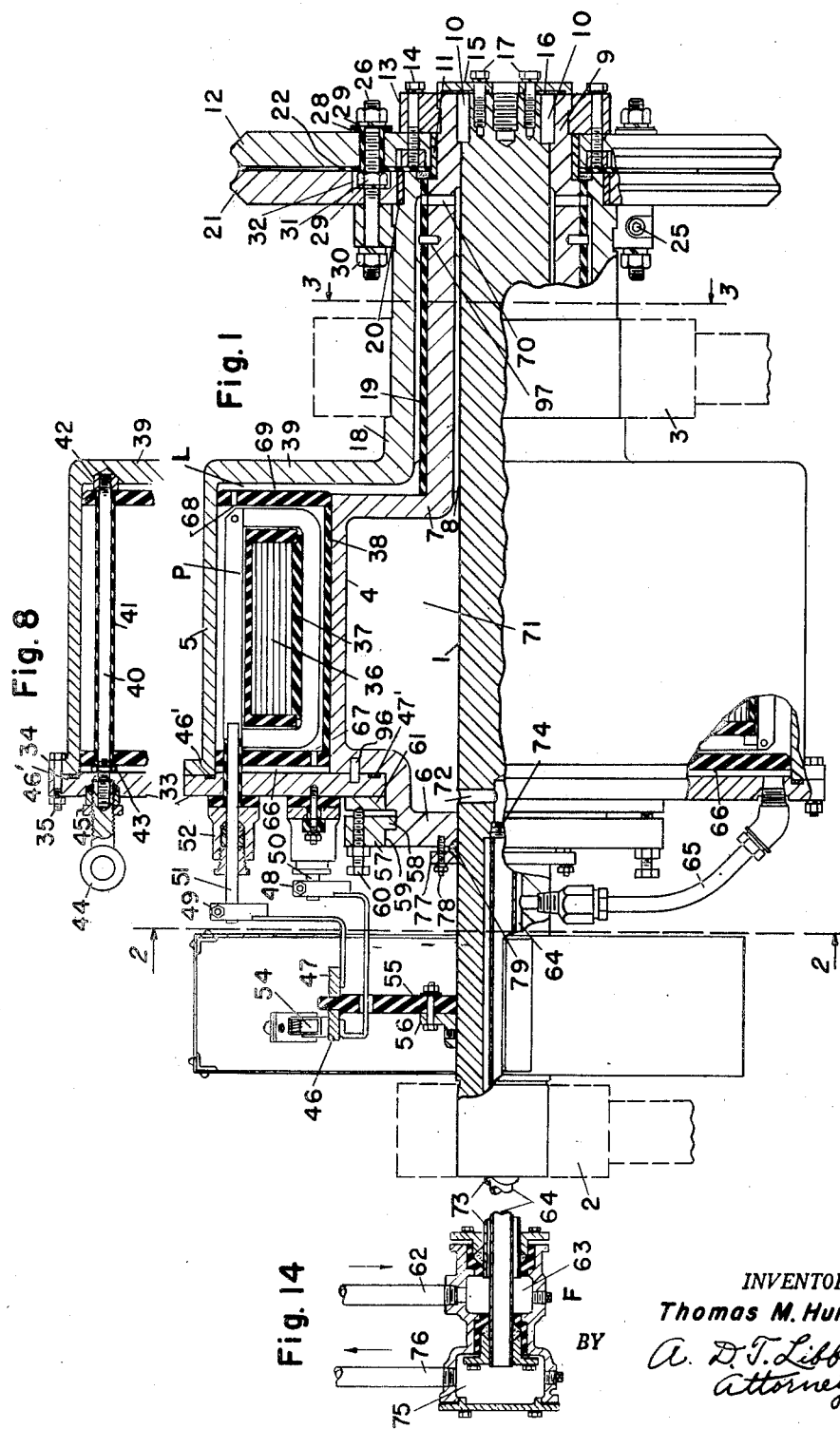
INVENTOR.
Thomas M. Hunter
BY A. D. T. Libby
Attorney July 24, 1951   T. M. HUNTER   2,561,739
ROTARY WELDING TRANSFORMER STRUCTURE
Filed March 19, 1947   6 Sheets-Sheet 2
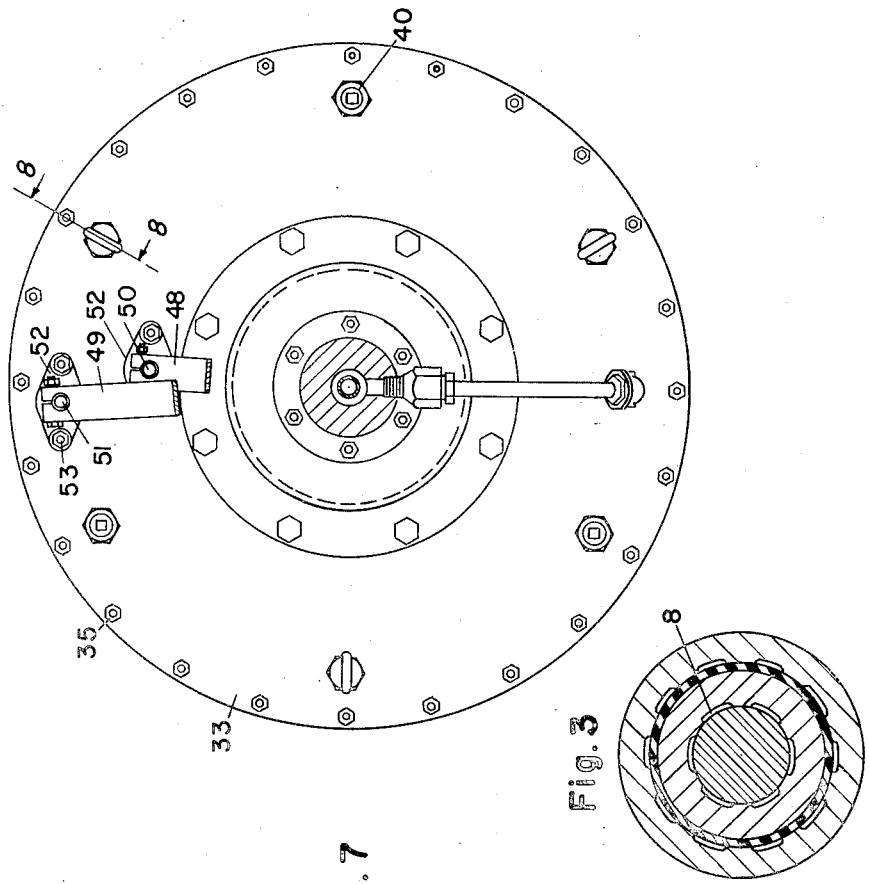
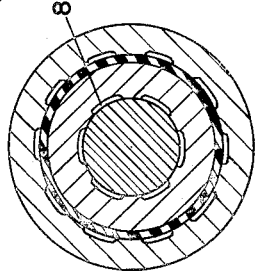
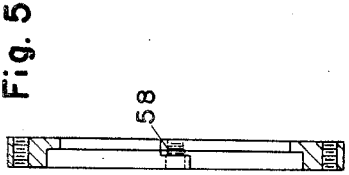
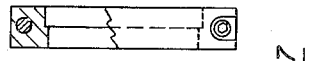
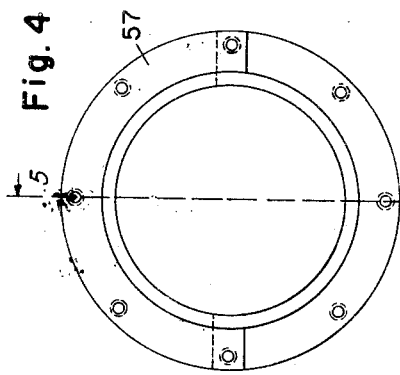
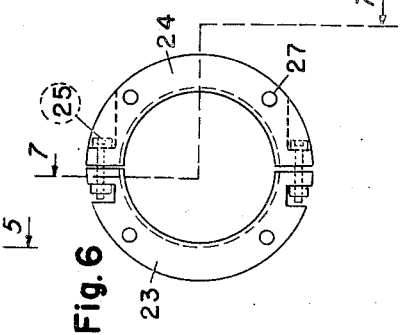
INVENTOR.
Thomas M. Hunter
BY
A. D. T. Libby
Attorney

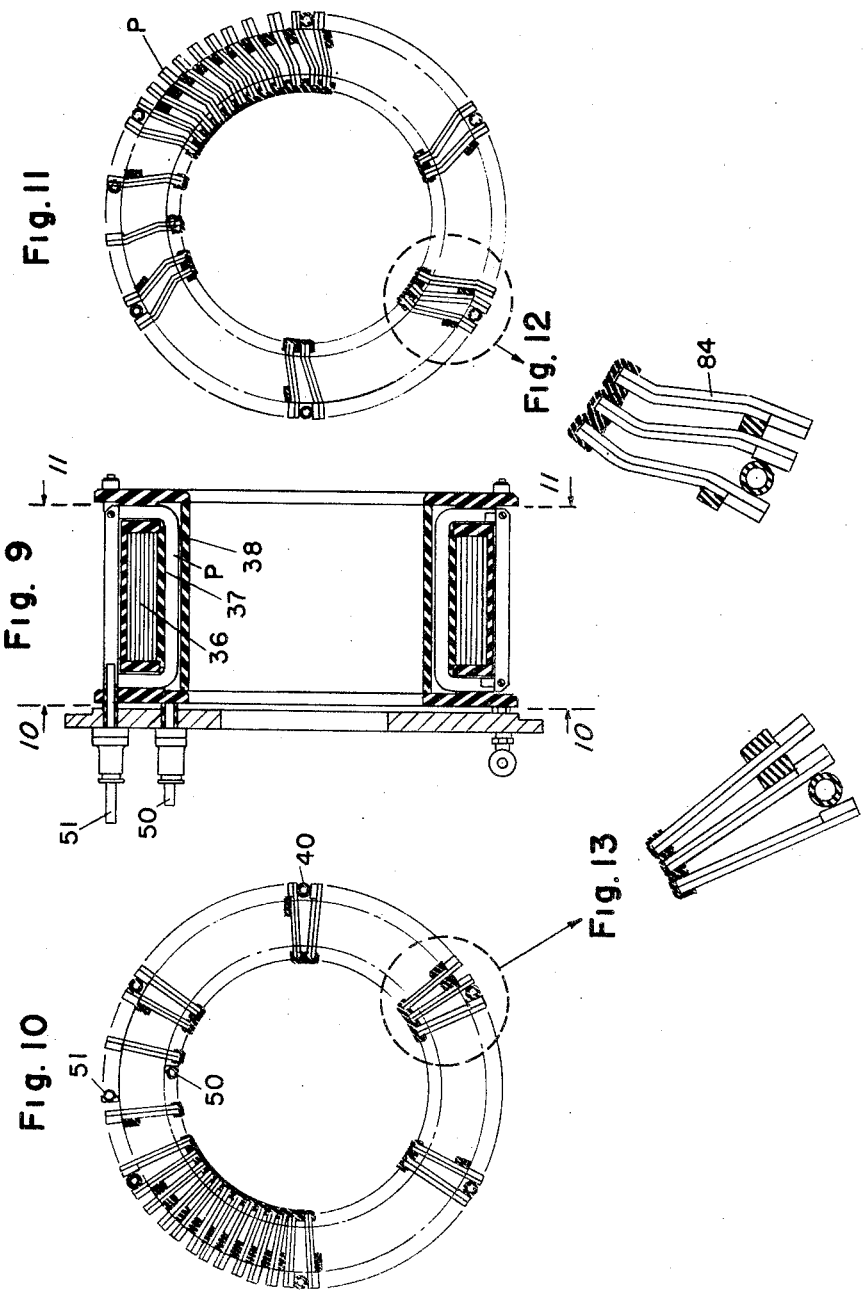

July 24, 1951 T. M. HUNTER 2,561,739
ROTARY WELDING TRANSFORMER STRUCTURE
Filed March 19, 1947 6 Sheets-Sheet 4
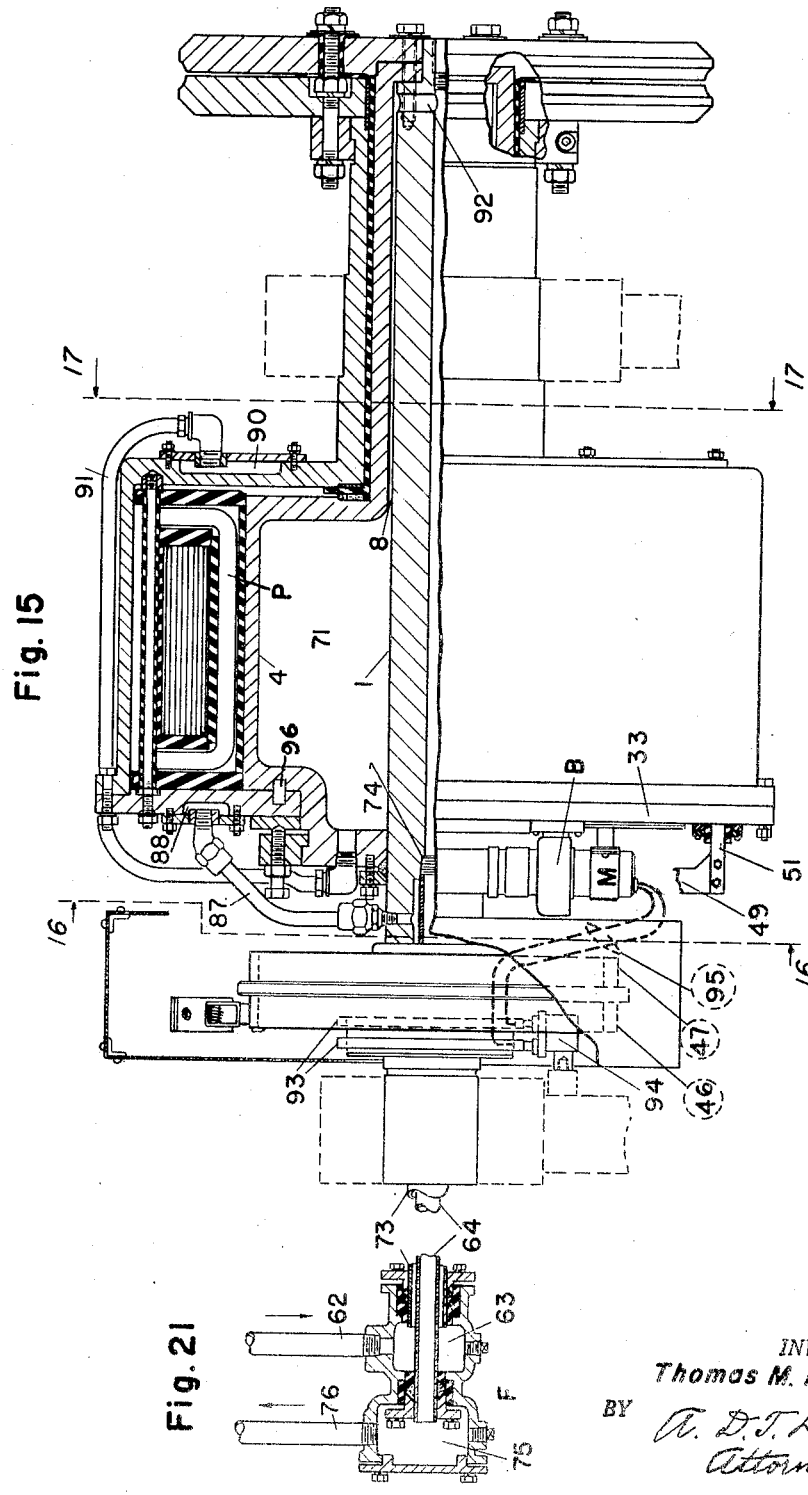
INVENTOR.
Thomas M. Hunter
BY A. D. T. Libby
Attorney

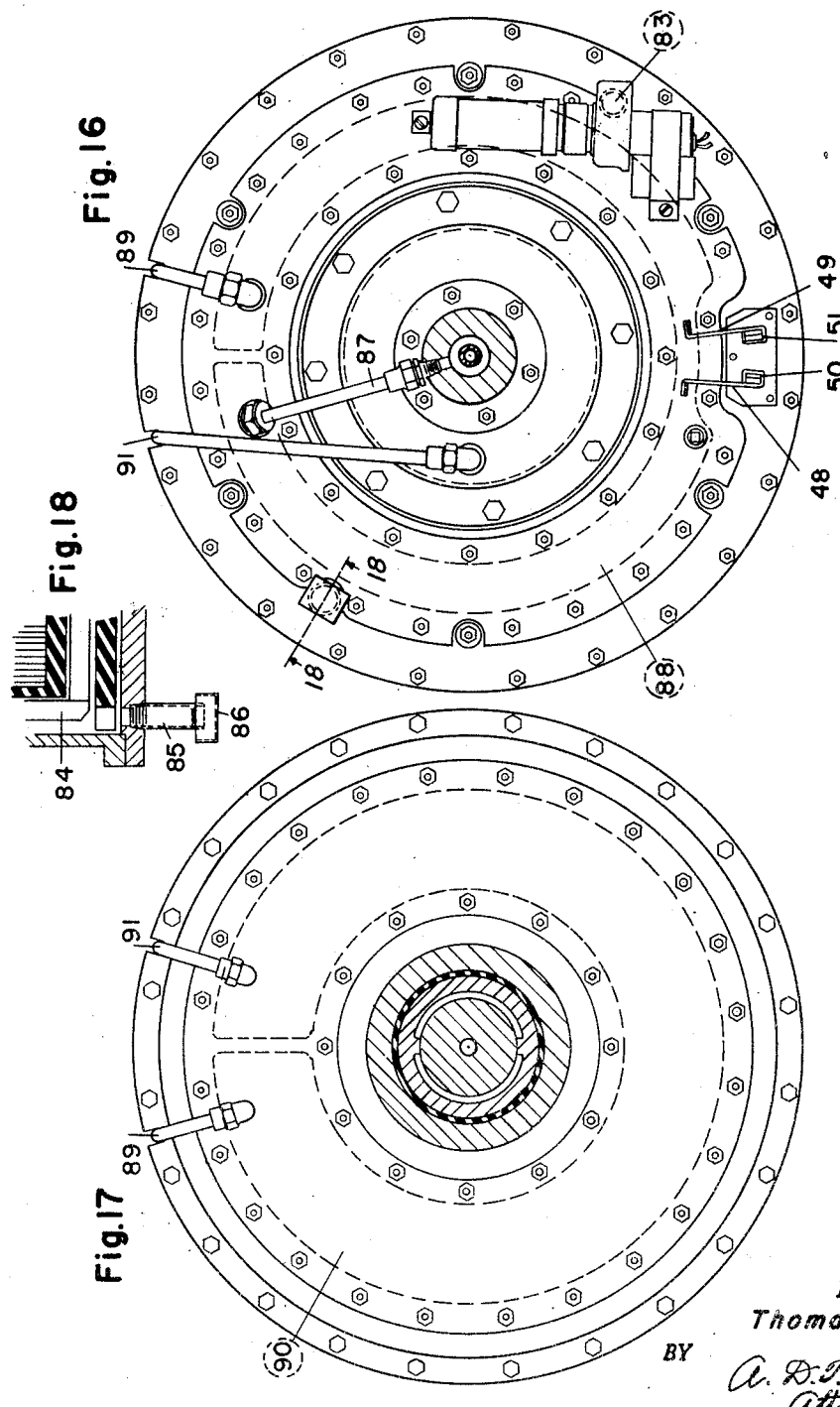

July 24, 1951     T. M. HUNTER     2,561,739
ROTARY WELDING TRANSFORMER STRUCTURE Filed March 19, 1947     6 Sheets-Sheet 6

INVENTOR.
Thomas M. Hunter
BY Albion D. T. Libby

Patented July 24, 1951

2,561,739

UNITED STATES PATENT OFFICE 2,561,739

ROTARY WELDING TRANSFORMER STRUCTURE

Thomas M. Hunter, Short Hills, N. J.

Application March 19, 1947, Serial No. 735,677

12 Claims. (Cl. 219—6)

This invention relates to improvements in rotary transformers, especially adapted for use in welding seams in sheet metal or tubing, wherein a large current with a low voltage is required.

In my Patent 2,241,015, issued May 6, 1941, I have shown and described a highly satisfactory type of rotary welding transformer. However, after further study of the construction and operation of the transformer of said patent, and that of other structures which I have designed and on which patents have been granted, I have discovered additional improvements which increase the efficiency and reduce the cost of construction and operation of a rotary seam welding transformer. These improvements include a construction in which the entire primary winding is assembled as a unit which can be removed without disturbing the entire assembling. This means that if at any time something should happen to the primary winding in operation, another unit which can be carried in stock, may be quickly substituted for the damaged unit. Another improvement of my present construction resides in the method of mounting the disc type electrodes, as will be later pointed out.

In a rotary welding transformer wherein water is used for cooling purposes condensation quickly takes place within the windings, especially the primary, and this reduces the dielectric strength of the insulation and leads to trouble. Therefore, one of the improvements in my present construction is the elimination of this condensation trouble.

I have also found, by the construction to be described, that electrical losses may be more effectively dissipated, especially when the primary winding is excited by frequencies above 60, such as 180 cycles by circulating oil through the winding.

These and other improvements will be understood by one skilled with these types of machines from a reading of the following specification taken in connection with the annexed drawings wherein:

Figure 1 is a longitudinal view of the apparatus, partly in section and partly in elevation.

Figure 2 is a view on line 2—2 of Figure 1.

Figure 3 is a view on the line 3—3 of Figure 1.

Figure 4 is a plan view of one of the detailed parts shown in Figure 1.

Figure 5 is a view on the line 5—5 of Figure 4.

Figure 6 is a plan view of another part of the machine shown in Figure 1.

Figure 7 is a view on the line 7—7 of Figure 6.

Figure 8 is a view on the line 8—8 of Figure 2.

Figure 9 is part sectional and part elevation of the primary unitary structure.

Figure 10 is a view on the line 10—10 of Figure 9, but showing only part of the turns of the primary winding.

Figure 11 is a view on the line 11—11 of Figure 9 showing the opposite end of the conductors from the showing of Figure 10.

Figure 12 is an enlarged view of the group of three end conductors as indicated in Figure 11.

Figure 13 is an enlarged view of the group of conductors as indicated in Figure 10.

Figure 14 is part sectional and part elevation showing the manner of conducting cooling fluid into the machine.

Figure 15 is a view similar to Figure 1 but showing a different method of cooling and means for preventing condensation within the windings.

Figure 16 is a view on the line 16—16 of view 15.

Figure 17 is a view on the line 17—17 of Figure 15.

Figure 18 is a partial sectional view on the line 18—18 of Figure 16.

Figure 21 is a view practically the same as Figure 14 showing the means of conveying cooling fluid to the machine.

Figure 19:
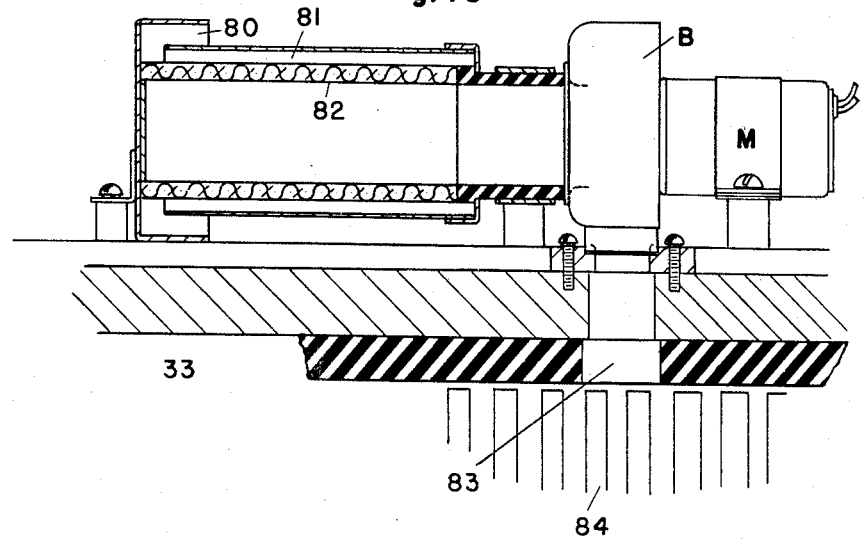
Figure 19 is a somewhat diagrammatical view showing the blower for blowing air through the windings.

Referring now to the details wherein like numbers refer to corresponding parts, 1 is a shaft having suitable supports 2 and 3. Fixedly carried on the shafts 1 is the secondary winding of the transformer. The secondary winding consists of two sections or parts 4 and 5, which are generally cylindrical in shape and separated a substantial distance apart for the purpose to be later described. One end of section 4 has an in-turn annular flange 6 that engages the shaft 1 for a support thereon. The opposite end of section 4 has an extension 7 partially spaced from the shaft a relatively small amount by arcuate spaces 8, for the purpose to be presently described. From Figure 3 it will be seen that the extension 7 has supports along its full length between the arcuate spaces 8 and the extreme end of the extension 7 has a full circular support portion 9 which engages the shaft 1, and which is keyed thereto by a plurality of keys 10. Positioned on the outer periphery of the portion 9 is seated a ring 11 of hard metal of a suitable kind and on this ring is mounted one of the electrodes 12, through the medium of a split shouldered clamping ring 13 and screw studs 14. A sealing plate 15 and gasket 16 being held in place on the end of shaft 1 by screws 17 for a purpose which will later appear. The section 5 of the secondary winding also has a projecting end 18 insulated from the end 7 by a tubular insulator 19. On the outer extremity of the end 18 is positioned a ring 20, the same type as ring 11. On this ring is positioned an electrode disc 21 held in spaced relation from the electrode disc 12 by insulated means 22. A clamping ring made in two parts 23 and 24 (see Figures 6 and 7) is utilized for assisting in holding the electrode discs 12 and 21 in operative position on the projecting ends 7 and 18 as will be seen from Figure 6. The two parts 23 and 24 are drawn together by bolts 25 shown in dotted lines in Figure 6. A plurality of screw studs 26 passes through the electrode discs 12 and 21 and through the holes 27 in the parts 23 and 24. The bolts 26 are insulated from disc 12 by suitable insulators 28 with lock washers 29 and lock nuts 30 at both ends, together with a lock nut 31 positioned in a recess 32 in the disc wheel 21. Since the two sections of the secondary winding are of good current conducting material such as copper, and likewise the electrode discs 12 and 21, the rings 11 and 20 of hard material are used so that in the disassembly and assembly of the discs 12 and 21 the wear on the parts at this junction is prevented by the hardened rings, contact from the projections 7 and 18 being made through the members 13, 23 and 24 which are both of good current conducting material. It may be noted at this point that if desired, the electrode discs 12 and 21 may be constructed with detachable contact shoes as shown in my Patent 2,241,015. It will be noted from Figure 1 that the open ends of the sections 4 and 5 of the secondary are closed by a disc 33 that is fastened to an annular flange 34 on the end of section 5 by a plurality of screw studs 35.

Positioned between the tubular sections 4 and 5 of the secondary winding there is located a unitary structure comprising a core of suitable transformer steel preferably wound up from a strip of a suitable width and thickness to form the core. Insulated therefrom by insulating means 37 there is a primary winding generally designated by the letter P, insulated from the secondary by various insulators generally referred to by the number 38.

The primary winding P, as illustrated in Figures 9, 10, and 11, is held in endwise spaced relation with respect to the downwardly extended annular part 39 of the section 5, and a primary closure plate 33, by a plurality of studs 40, six of which are illustrated in Figure 2. These studs are insulated by insulators 41 and each has a nut 42 at one end set in a recess in part 39, and a positioning nut 43 at its opposite end, so that the end insulators for the end turns of the primary P, are positioned away from the part 39 and closure plate 33. Three of these bolts 40 have eye studs 44 fastened thereto and to the plate 33, each by way of a screw threaded bushing 45 or other suitable means. Packing glands 46' and 47' are utilized to prevent cooling fluid from leaking out around the closure plate 33.

Connection is made to the primary winding through the means of a pair of slip rings 46 and 47 with their respective connectors 48 and 49 which are fastened to connecting rods or studs 50 and 51 (see Figure 2). The connecting studs 50 and 51 are carried by similar insulating members 52 that are fastened to the plate 33 by screw studs 53. The stud 50 is designated as the incoming or beginning of the primary winding, while the stud 51 is connected to the end of the primary as shown in Figure 1. Only one brush and one brush holder 54 is illustrated. Slip rings 46 and 47 are carried on an insulator 55 that is supported on the shaft 1 by any suitable means, as by an annular flanged ring 56 which may be welded to the shaft.

For additional holding means for the closure contact plate 33, a split ring 57 is utilized. The two parts of the ring 57 have an inwardly projecting flange 58 for fitting over an annular flange 59 on the support portion 6 of the secondary section 4. The member 57 carries a plurality of screw studs 60 that engage a ring 61 of hardened material for forcing the inner part of the plate 33 tightly against the annular shoulder on section 4.

For cooling the transformer structure shown in Figure 1, I prefer to use oil. This is supplied by way of a fitting generally referred to as F (Figure 14). The fitting has an intake pipe 62 connected to a chamber 63, the outlet tube 73 of which extends into the end of shaft 1 and carries the fluid to the pipe 65, and this in turn to a space 66 around one end of the primary unit. The insulator at this end has a plurality of holes 67 therein to allow the oil to pass around the primary winding as well as the interior part of the secondary and out through the openings 68 at the opposite end of the unit into a space 69 from which it passes through a hole 70 into the arcuate spaces 8 around shaft 1 and then into the large chamber 71 below the secondary section 4. From the chamber 71 an outlet 72 is provided which leads into a pipe 64 having a threaded end 74 engaging the shaft as illustrated. Pipe 64 connects with the chamber 75 and that, with the outlet pipe 76. To prevent oil from seeping out around the annular shoulder 6 of section 4, a plate 77 is fastened as by screw studs 78 to the flange 6, a gasket 79 being held in place by the plate 77.

The construction shown in Figure 15 is substantially the same as in Figure 1, except for the manner of cooling the structure. In this form, a blower generally referred to as B is mounted on the end plate 33 and is provided with air intakes 80 and 81 and a filter, preferably also acting as a drier 82. The outlet from the blower B passes through an opening 83 into the spaces between the primary bars 84 shown diagrammatically in Figure 19. After passing around the conductors 84, the air passes through an exit 85 having a cap 86 thereon. The object of passing the dry air through the primary winding is as heretofore explained, to prevent any condensation on the winding where water is used as a cooling fluid.

In this form, water is brought through the pipe 62 (see Figure 21) into the chamber 63 and through the pipe 73 located within the end of shaft 1 and by way of a pipe 87 to the chamber 88 and out by way of pipe 89 over to the opposite end of the primary unit to a chamber 90 and from this chamber by way of pipe 91 into the large chamber 71 formed between the shaft 1 and the section 4. The water then moves through the arcuately positioned passageways 8 and hole 92 in the shaft and out by way of the pipe 64 to the chamber 75 and outlet pipe 76.

Figure 20:
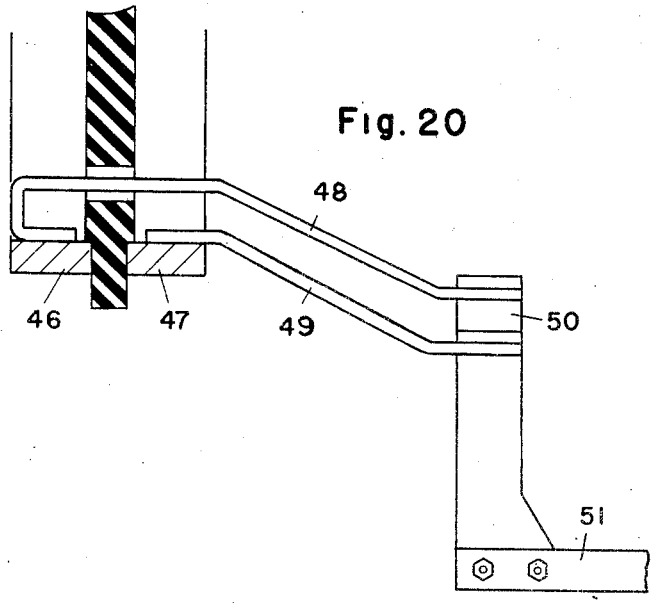
Figure 20 is also a diagrammatical view showing the manner of conveying current to the primary winding of the transformer and to the blower motor.

Current is taken to the primary winding in the same manner as in Figure 1, however, all of the connections are not shown in Figure 15 and only diagrammatically in Figure 20, wherein the member 50 is arcuately displaced from the member 51. Current is conveyed to the motor M of the blower B through the medium of a pair of slip rings 93 and cooperating brushes 94 and conductors 95.

It may be mentioned in passing that dowel pins 96 are used to position the plate 33 on the member 4, and dowel pin 97 is utilized to position the circular insulator 19 on the extension 7 of member 4.

It will be clear from the drawings that many of the details may be varied without departing from the spirit of my invention and the scope of the depending claims.

I claim:

1. A rotary welding transformer structure including, a shaft with supports therefor, a secondary winding having inner and outer cylindrically shaped parts at a spaced distance from each other while the inner part is spaced near one end a substantial distance from the shaft to form a cooling chamber, except for an annular flange at this end that engages the shaft for a support, the said inner and outer parts being joined at this end by a removable closure plate of suitable current conducting material both parts having concentric cylindrically shaped projecting ends insulated from each other and positioned relatively close to the shaft, the inner projecting end having a support on the extremity of the shaft and each projecting end having an electrode disc fastened thereto in co-operative relationship, a primary winding and core positioned as a readily removable unit between the two first mentioned parts of the secondary and being removable therefrom when said closure plate is removed and means including parts carried by said plate for conveying current to the primary winding.

2. A rotary welding transformer structure including, a shaft with supports therefor, a secondary winding having inner and outer cylindrically shaped parts at a spaced distance from each other while the inner part is spaced near one end a substantial distance from the shaft to form a cooling chamber, except for an annular flange at this end that engages the shaft for a support, the said inner and outer parts being joined at this end by a removable closure plate of suitable current conducting material both parts having concentric cylindrically shaped projecting ends insulated from each other and positioned relatively close to the shaft, the inner projecting end having a support on the extremity of the shaft and each projecting end having an electrode disc fastened thereto in co-operative relationship, a primary winding having a core of magnetic material, assembly plates between which the primary and core are positioned to form a unit that is removably positioned between the first mentioned parts of the secondary when said closure plate is removed, means for spacing the unit in its assembled position to form spaces for cooling fluid at each end of the unit, and means for conveying current to the primary winding.

3. A rotary seam welding transformer structure including, a shaft with supports therefor, a secondary winding relatively fixed upon the shaft for rotation therewith, the secondary winding having certain sections thereof spaced a substantial distance apart, a unitary structure of a primary winding and core normally positioned between said spaced secondary sections, said secondary winding sections having projecting ends of reduced diameter extending beyond the shaft support at this end of the structure, electrode discs carried on the extremity of said ends, removable current conducting means closing the opposite ends of said secondary sections and means for assisting in locating the primary unitary structure longitudinally within and in spaced relation with the first mentioned section of the secondary to form cooling chambers and for removing the unitary structure from its normal operative position when said removable means has been removed from closure position and means for passing current to the primary winding.

4. A rotary seam welding transformer structure as set forth in claim 3 further defined in that the inner of said secondary section is spaced except at its ends from the shaft to form a chamber for a suitable cooling fluid, and means for passing a suitable cooling fluid such as a suitable oil through the said spaces and primary winding and around the interior of the secondary sections.

5. A rotary seam welding transformer structure including, a shaft with supports therefor, a secondary winding relatively fixed upon the shaft for rotation therewith, the secondary winding having certain sections thereof spaced a substantial distance apart, a unitary structure of a primary winding and core normally positioned between said spaced secondary sections said secondary winding sections having projecting ends of reduced diameter extending beyond the shaft support at this end of the structure, electrode discs carried on the extremity of said ends, removable current conducting means closing the opposite ends of said secondary sections, the inner one of which is spaced a considerable distance from the shaft along the area below the unitary structure to form a large cooling chamber, fluid cooling chambers located at opposite ends of said unitary structure with means for interconnecting said chambers and means for feeding cooling fluid through said shaft to and from said chambers.

6. A rotary seam welding transformer structure as set forth in claim 5 further defined in that means are provided for forcing a suitable gas through the turns of the primary winding for the purpose described.

7. A rotary seam welding transformer structure as set forth in claim 12 further defined in that means are provided through the medium of cooling chambers with means for passing cooling fluid therethrough for cooling both the primary and secondary windings with further means being provided for passing a suitable gas that is preferably filtered over and around the turns of the primary winding, if water is used as the said cooling fluid.

8. A rotary seam welding transformer structure as set forth in claim 12 further defined in that means are provided through the medium of cooling chambers with means for passing cooling fluid therethrough for cooling both the primary and secondary windings and further means for preventing condensation of moisture on the conductors of the secondary winding when a cooling fluid is used which will cause such condensation within the primary winding.

9. A rotary welding transformer structure as set forth in claim 12 further defined in that said circular electrodes are seated on rings of hard metals that are located over the extremities of their respective extensions of the two parts of the secondary winding.

10. A rotary welding transformer structure having a shaft with bearings and a pair of circular electrodes on one end of the shaft; said structure comprising a secondary winding extending longitudinally of and being fixed upon the shaft for rotation therewith with its two extending ends connected to their respective circular electrodes, said winding being in two individual parts which are laterally spaced at one end sufficiently to form a housing, one end of which is one of said parts, a removable closure plate of good current conducting material for the other end of the housing, said plate carrying terminals for a primary winding, a primary winding adapted to be connected to said terminals and having a core of magnetic material located as a unit within said housing and removable therefrom as a unit after the closure plate is taken off.

11. A rotary welding transformer structure having a shaft with bearings and a pair of circular electrodes on one end of the shaft; said structure comprising a secondary winding mounted on the shaft for rotation therewith, said winding being in two separate parts extending for a considerable length along the shaft and being closely spaced from each other at one end and adapted to be connected to said circular electrodes, the opposite ends of said two parts being offset from each other to form a housing space, a unit structure including a core of magnetic material and a primary winding around the core, said unit being located within said housing, a removable plate of suitable material for closing the housing at the secondary ends farthest away from said electrodes and means carried by said plate for conveying current to said primary winding.

12. A rotary welding transformer structure having a supporting shaft with circular electrodes on one end; said structure including a secondary winding in two main cylindrically shaped parts concentrically arranged with the inner of said two parts being directly carried on said shaft, both of said parts having closely spaced extensions at one end each of which terminates in one of the circular electrodes, said parts at their ends opposite said electrodes being more widely spaced to receive a primary winding with its core, a removable plate of suitable metal for closing an electrical circuit between these more widely spaced ends of the secondary, a primary winding and a core positioned as a unit between said more widely spaced parts of the secondary but removable as a unit when said plate is removed without disturbing said circular electrodes and their connected secondary ends.

THOMAS M. HUNTER.

REFERENCES CITED

The following references are of record in the file of this patent:

UNITED STATES PATENTS

| Number | Name | Date |
|---|---|---|
| 1,394,901 | Hobart | Oct. 25, 1921 |
| 1,478,262 | Snodgrass et al. | Dec. 18, 1923 |
| 1,979,882 | Hunter | Nov. 6, 1934 |
| 2,052,963 | Caputo | Sept. 1, 1936 |
| 2,241,015 | Hunter | May 6, 1941 |